May 1, 1951    E. L. BARRETT    2,551,198
RECORD MECHANISM
Filed March 22, 1947    6 Sheets-Sheet 1
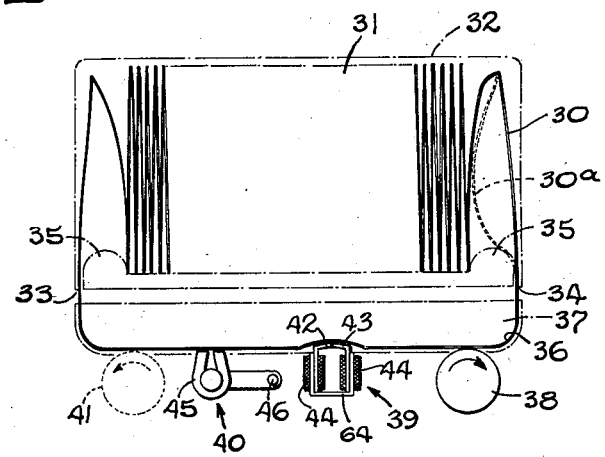
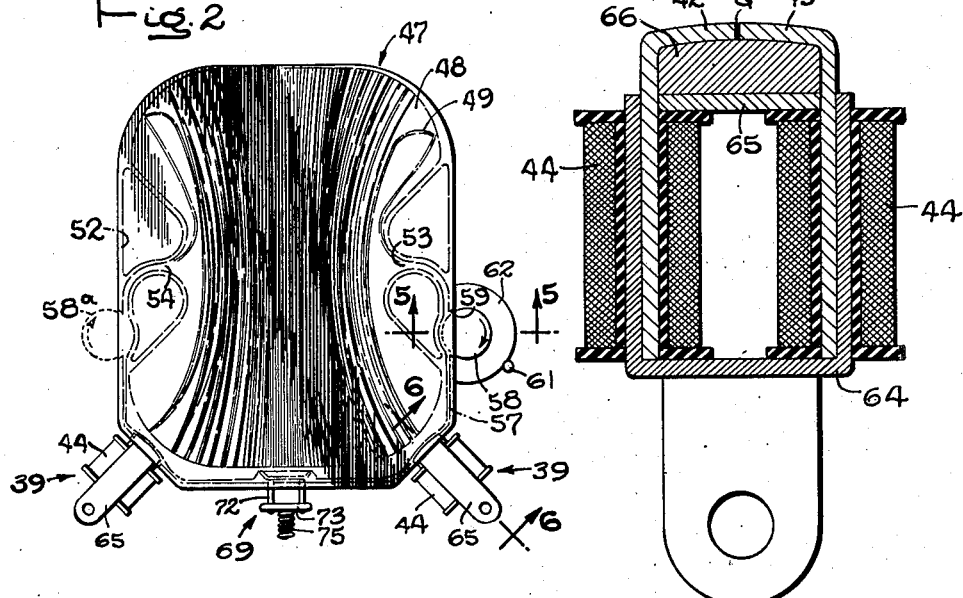
INVENTOR
Edward L. Barrett
By Carlson, Pitzner, Hubbard & Wolfe
ATTORNEY May 1, 1951 E. L. BARRETT 2,551,198
RECORD MECHANISM
Filed March 22, 1947 6 Sheets-Sheet 2

INVENTOR
Edward L. Barrett
By Cushman, Pitzner, Hubbard & Wolfe
ATTORNEYS

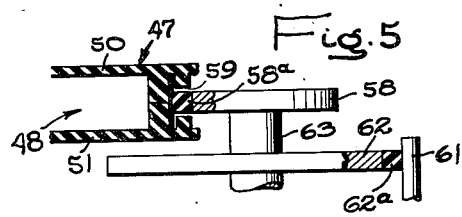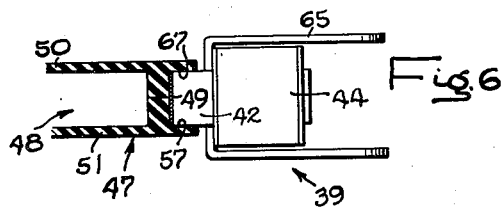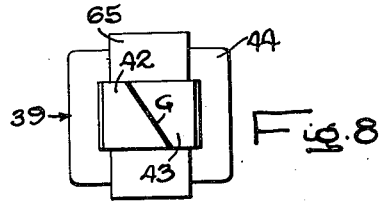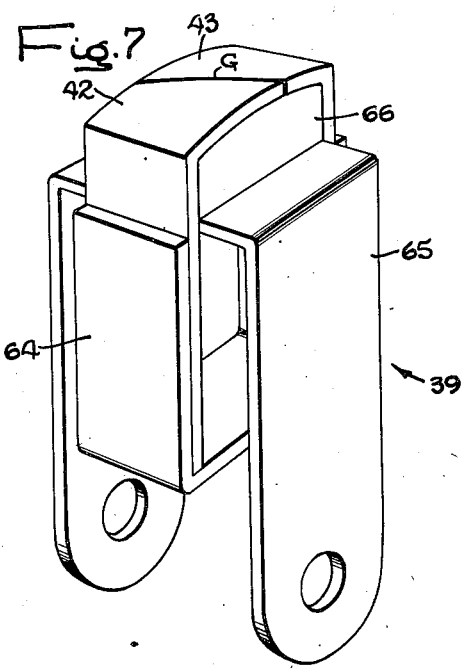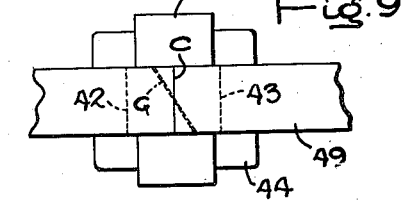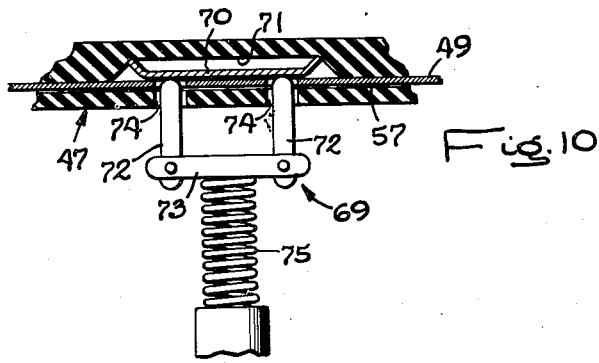

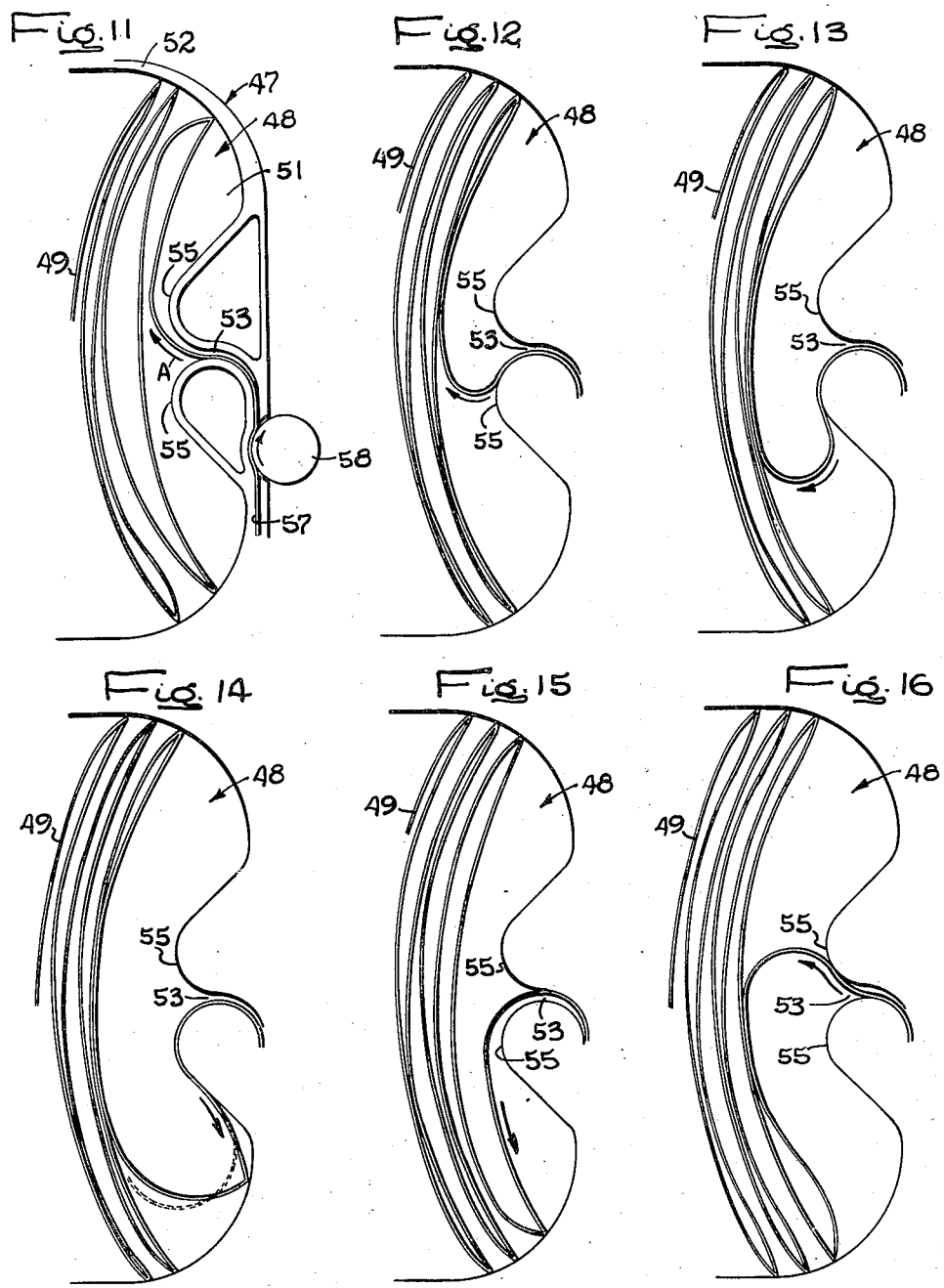

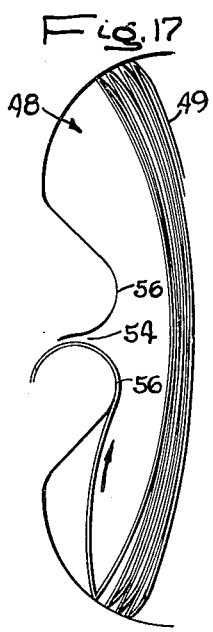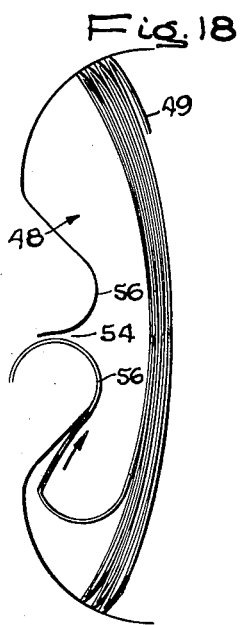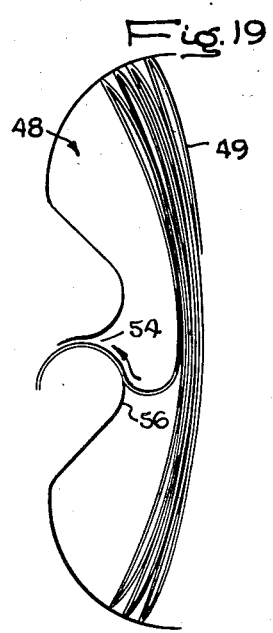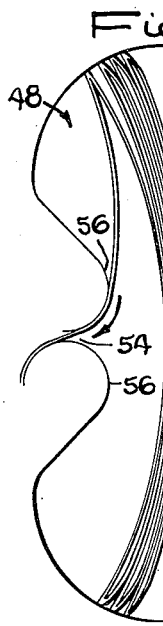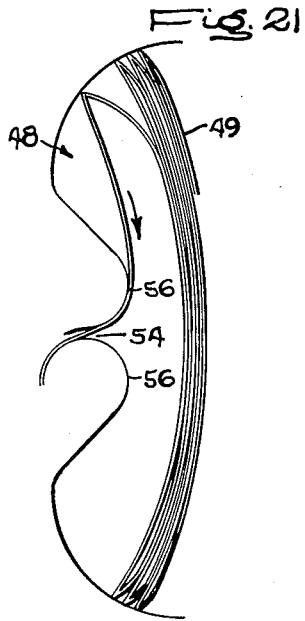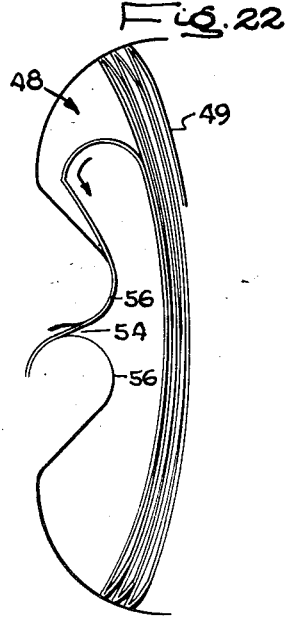
INVENTOR
Edward L. Barrett
ATTORNEYS May 1, 1951 E. L. BARRETT 2,551,198
RECORD MECHANISM Filed March 22, 1947 6 Sheets-Sheet 6

INVENTOR
Edward L. Barrett
By Carlson, Pitzner, Hubbard & Wolfe
ATTORNEYS

Patented May 1, 1951

2,551,198

UNITED STATES PATENT OFFICE 2,551,198

RECORD MECHANISM

Edward L. Barrett, La Grange, Ill., assignor to Edward L. Barrett and Ann K. Barrett, co-partners, doing business as Barrett-Keenan Company, Chicago, Ill.

Application March 22, 1947, Serial No. 736,603

13 Claims. (Cl. 179—100.2)

The present invention pertains to record mechanisms and more particularly to such mechanisms in which a record is magnetically impressed upon, or reproduced from, a paramagnetic (magnetizable) tape. The mechanism here disclosed is useful either in recording or reproducing, or both, as will presently appear in greater detail.

The record "tape" itself is but one component element of the mechanism and may be variously constituted. Presently there is such tape on the market made of paper and coated or impregnated with finely divided paramagnetic material. Such tape is an example of one that may be employed in the present invention. It has heretofore been the practice to wind such tape on a storage spool, and in use, to reel it from that spool to another, passing it over a recorder or reproducer head. The setup has been generally like that utilized in reel-type wire recorders. It has also been proposed that the tape might be constituted by a motion picture film along an edge portion of which a coating of paramagnetic material would be applied in constituting a sound track, the film being reeled and unreeled in more or less a conventional manner for motion picture films.

In all such earlier machines which have been marketed it has commonly been the practice to reel the tape from one spool or reel to another, an inherently expensive and cumbersome arrangement. Moreover, it is one which inevitably introduces many difficulties of operation, including liability of breaking the tape by over-tensioning it, large inertia of the parts to be overcome at starting and stopping, and maintenance of constant speed of the tape past the head despite progressively changing diameter of the storage reel of tape and hence variation in linear speed of the tape with uniform rotational speed of the reel. The complex controls and brakes required are inevitably expensive, prohibitively so for many applications.

My aim is to dispense with reels or spools entirely, and in fact with winding of any kind, in handling recorder tape.

In contrast with the prior art practice of reeling or spooling paramagnetic record tape I propose, instead, to crease it permanently in accordion pleats. So pleated, I aim to store the tape, bundled accordion fashion, in a suitable cartridge or other holder, the tape being pulled out or pushed back into the container as required.

Contrary to normal expectation, I have discovered that the creasing can be employed, in proper apparatus, without interfering with good reproduction of sound and even when using a coated or impregnated type of tape such as that referred to above. The paramagnetic coating on paper tape being microscopically thin, it would be a natural supposition that a click would result as each crease passed the reproducer head because of impairment of the coating at the crease. By actual test, however, I have found that such is not the case, and moreover, that even when the tape is run so long that the coating is actually cracked or worn off at the creases that the novel reproducer head herein disclosed prevents any adverse effect on the recording or reproduction. This reproducer head is described in detail and claimed in my copending divisional application Serial No. 3,149 filed January 19, 1948, now Patent No. 2,543,483, granted February 27, 1951.

Moreover, it has been my objective to provide a container for the bundle of tape of such character that the only moving part required for feeding it at fixed, uniform speed past a head is a simple little motor driven friction roller, and to provide stationary parts of the container, coacting with the creased tape, to cause it to flow smoothly fold-by-fold into and out of the stored accordion bundle without catching, kinking or snarling. That is to say, it has been my object to provide a container such that upon merely pushing the tape into it, progressively in an endwise direction, the tape will automatically lay itself down smoothly and easily into its required folds.

It has also been my object to provide such a device in the form of a self-contained replaceable cartridge that can be made at low cost and in large quantities.

Further objects and advantages of the invention will become apparent as the following description proceeds taken in connection with the accompanying drawings, in which:

Figure 1 is a generally diagrammatic plan view of one form of apparatus embodying certain general aspects of the present invention.

Fig. 2 is a plan view of a preferred form of cartridge type of recorder apparatus embodying certain salient aspects of the invention, the associated heads and feed rollers used with the cartridge also being indicated in Fig. 2.

Fig. 3 is an enlarged longitudinal sectional view of one of the heads included in the apparatus of Fig. 2.

Figs. 5 and 6 are enlarged fragmentary, detail views taken in section substantially along the lines 5—5 and 6—6, respectively, in Fig. 2.

Fig. 7 is an enlarged, detail perspective view of one of the recorder-reproducer heads, included in the apparatus of Fig. 2, the same being shown without its actuating windings.

Fig. 8 is a face or end view, on somewhat smaller scale, of the head shown in Fig. 7.

Fig. 9 is a view similar to Fig. 8 but showing a portion of creased tape passing across the active end of the head.

Fig. 10 is an enlarged, detail sectional view of the stop switch and associated parts included in the mechanism of Fig. 2.

Figs. 11 to 16 are enlarged fragmentary stop motion views showing the progressive changes in configuration of the tape as it enters the cartridge of Fig. 2.

Figs. 17 to 22 are similar stop motion views showing the progressive configurations of the tape as it is pulled out of the storage chamber in the cartridge of Fig. 2.

Figure 23:
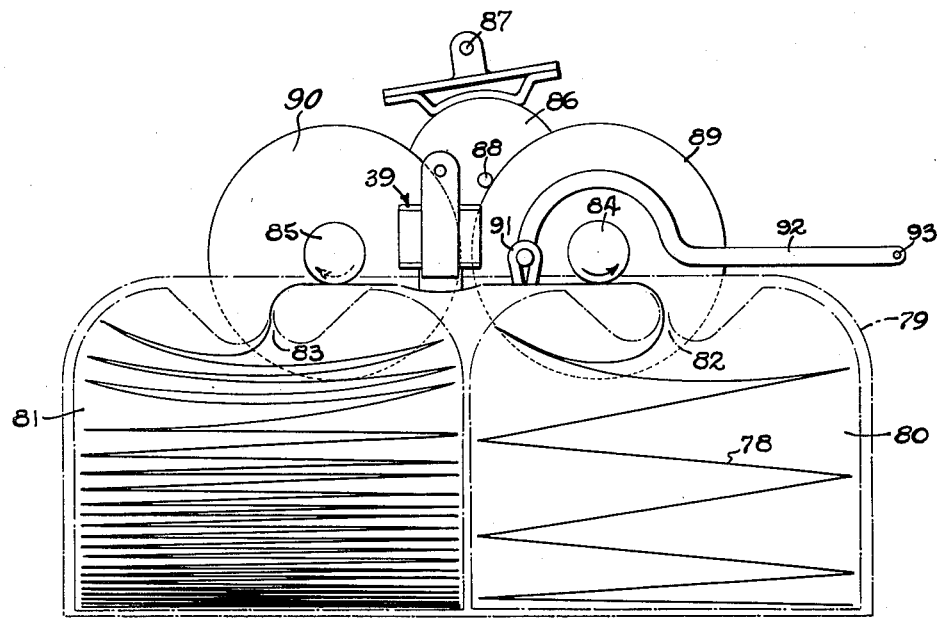

Fig. 23 is a generally diagrammatic illustration of still another form of apparatus embodying the present invention and in which a single length or double ended piece of tape is employed as distinguished from the endless loop of tape used in the setups of Figs. 1 and 2.

Although certain particular embodiments of the invention have been illustrated and described in some detail herein, there is no intention to thereby limit the invention to such specific embodiments. On the contrary, the intention is to cover all modifications, alternative arrangements and constructions falling within the spirit and scope of the invention as expressed in the appended claims.

Referring more particularly to the illustrative embodiments of the invention shown in the drawings, reference may first be made to the diagrammatic showing in Fig. 1. In the installation there indicated a resilient, paramagnetic record tape 30 is provided, being fashioned in this instance as an endless loop. The bulk or major portion of such loop of tape is housed in a storage chamber 31 defined by a box-like casing indicated in dotted-dash lines at 32. In the event that a coated or other type of tape is used which is paramagnetic on only one side the loop is arranged with the sensitive side of the tape on the outside of the loop.

The tape 30 is creased transversely at uniformly spaced points throughout its length to effect an accordion pleating or zig-zag form of the same. The tape, so creased, is bundled accordion fashion within the chamber 31 and led out from the chamber through openings 33 and 34 arranged adjacent the opposite ends of the casing. In this instance the openings are located substantially at two adjacent end corners, being fashioned in a longitudinal side wall of the casing. The lower side wall of the casing 32 in which the openings 33, 34 are located, has smoothly rounded inwardly extending projections 35 thereon, disposed inboard of the respective openings. These projections 35 aid in causing the tape to assume its proper accordion configuration within the chamber and in retaining it so configurated.

The portion or bight of tape 30 extending between the openings 33, 34 exteriorly of the chamber 31 is led over a smoothly contoured guide surface constituted in this instance by a wall of a channel 36 fashioned in a block 37 which is structurally separate from the casing 32. The outer wall of the channel 36 is apertured at spaced points along its length for reception of various associated devices including a friction feed or drive wheel 38, a recorder-reproducer head 39 and an "eraser" head 40, and if desired a reversing drive wheel or roller 41.

The elements 38 to 41 may take various specific forms, details of certain preferred structures being set forth later herein in connection with certain other embodiments of the invention which are later described. For the present suffice it to say that the recorder-reproducer head 39 presents a pair of pole pieces 42, 43 to the tape and over which the tape rides. Energizing windings 44 encircle the pole pieces. The usual electronic equipment (not shown), well known in the art, may be used for energizing the windings 44 to impress a desired magnetic pattern on the tape, or alternatively, a sound record in the form of a magnetic pattern impressed on the tape may be used to vary the excitation of the windings 44 for reproduction of such sound record. To "erase" a magnetic record from the tape 30 a high frequency alternating current, or a direct current may be applied to the windings 44, or alternatively an eraser head such as 40 may be employed. Such head is shown as including a horseshoe shaped permanent magnet 45 carried by an arm pivoted at 46 to swing into and out of operative relation with the tape. If it is desired to reverse the direction of tape movement for any reason a second feed roller 41, revolving in a direction opposite to that for 38, may be used.

With the apparatus diagrammed in Fig. 1 the feed roller 38 may be driven by a suitable constant speed electric drive motor such as that shown in Fig. 4 and hereinafter described. In such case the roller pulls the tape endwise across the recorder-reproducer head 39 at a constant and uniform rate controlled solely by the speed of the roller and without any of the difficulties of speed variation that commonly attend drive of a take-up spool or reel with constantly changing diameter of the roll of tape in the spool. Moreover, stopping and starting of the tape drive or feed may be accomplished without attendant difficulties of inertia of moving parts. Only the short bight of tape extending between the ends of the accordion bundle in the chamber 31 is moving endwise at any time and its inertia is so small as to be completely negligible. Even coasting of the feed roller itself need not be a factor since by simply effecting a relative bodily shift of the tape and feed roller 38, laterally of each other, into and out of engagement the feed of the tape can be stopped or started at will. In other words, the roller itself can be moved bodily into or out of engaging position, or alternatively the support 37 for the tape can be swung into and out of a position where the roller engages the tape. Either one will effect instantaneous starting and stopping of the tape. So good is the control that words can be broken up syllable by syllable during recording and yet no interruption will be heard in the final record.

As the roller 38 shoves the tape 30 endwise through the entrance opening or throat 34 it is laid down automatically in the chamber 31 in successive accordion pleat folds and at the same time the tape is progressively withdrawn, fold by fold, through the exit opening 33 at the opposite end of the chamber. Assuming that the tape is in the full line position shown in Fig. 1, as more tape is shoved through the entrance opening 34 the last fold of tape buckles to the left to the dotted line position indicated as 30a. With continued pressure of the entering tape the crease at the bottom of the fold which is being formed is pushed over the top of the adjacent projection 35 and snaps into place behind the latter. The following portion of tape then moves upward starting the next fold. Further detail of the progressive movement of the tape is given hereinafter in connection with the preferred cartridge of Fig. 2, being illustrated in the stop motion views in Figs. 11 to 16 and 17 to 22.

It will be apparent from the foregoing that an apparatus of the general style indicated can be fashioned using simple low cost parts and without any of the complications and operating difficulties commonly encountered with the old reel style of winding apparatus.

An important aspect of the present invention is that it makes it possible to furnish the record tape as a part of a self-contained replaceable record cartridge. Such cartridge, pursuant to my invention, comprises a properly pleated or folded portion of tape, a housing for retaining the same bundled in accordion fashion and suitable guides for the tape, all in a unitary structure. Such a cartridge is shown in Figs. 2 and 4. It can be merchandised as a separate, low cost, replaceable unit. Such cartridges are suitable for use in a great variety of types of recording or reproducing machines which, to mention but a few, include voice and music or other recording and reproducing machines, home radio receiver recorders, dictaphones, record players for public or private entertainment and telephone monitors. The cartridge can be readily packaged and handled, being about the size and shape of a cigarette case, and can be readily inserted or removed in a machine designed for its reception. Its size and shape make it in many ways easier to handle than either the familiar disk or cylinder forms of scribed sound records.

In the illustrated cartridge (Figs. 2 and 4), designated generally as 47, an interiorly located storage chamber 48 is defined in a suitable housing structure for reception of an accordion pleated paramagnetic record tape 49. This tape is an endless loop, as in the case of the tape 30 in Fig. 1 with the paramagnetic material on the outside of the loop and is, like the tape 30, creased transversely at uniformly spaced points throughout its length to constitute accordion pleats. In fact the tapes 30 and 49 are identical except that the creases in the latter are spaced apart farther than in the tape 30 to give longer folds. That change is made because the cartridge 47 is constructed to permit somewhat longer folds (assuming the same size and thickness of tape) than in the case of the housing 32 in Fig. 1. In comparing the cartridge 47 and the casing 32 it is also to be noted that guide surfaces for receiving the bight of the tape 49 which extends exteriorly of the chamber 48 in the cartridge 47 are formed on the body of the cartridge itself rather than on some structurally separate element like 37 in Fig. 1.

To facilitate economical large scale manufacture the housing portion of the cartridge 47 is desirably made of molded plastic. Moreover, it is preferred that a transparent plastic material be employed so that the condition, location and movement of the tape 49 can be observed whenever desired, particularly in checking the amount of tape remaining for additional recording through use of an indicator arrangement described below.

Figure 4:
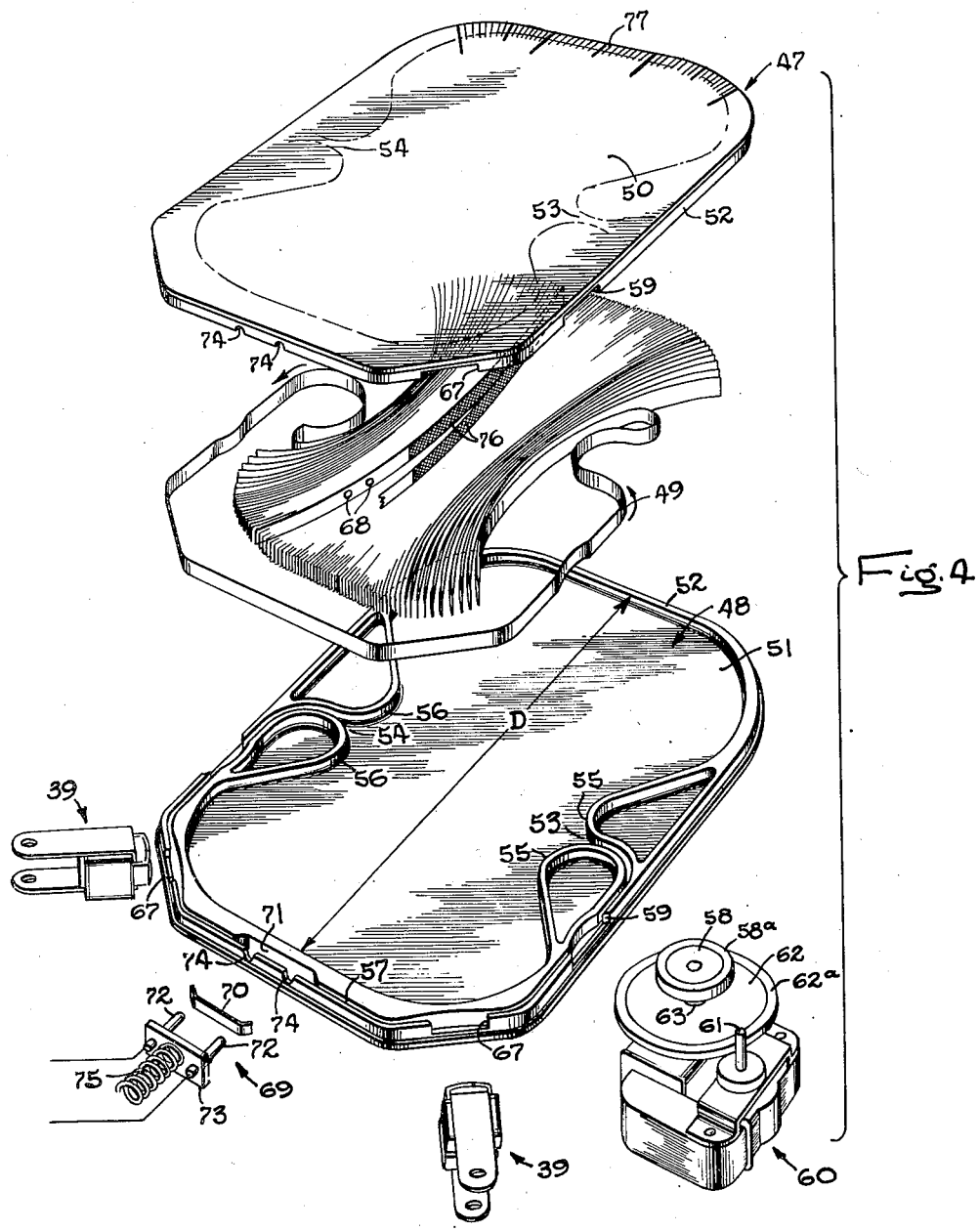
Fig. 4 is an exploded perspective view of the cartridge and associated apparatus shown in Fig. 2, the scale being somewhat enlarged as compared to Fig. 2.

In the instant embodiment the housing structure of the cartridge 47 comprises thin flat top and bottom wall panels 50, 51 of molded plastic (see Fig. 4). The chamber 48 is bordered by peripheral side and end walls constituted by integral upstanding ribbing 52 on the panels 50, 51. The upper and lower halves of the housing constitute two complemental and identical half shells, just as if the housing as a whole had been sliced lengthwise through its center along a plane paralleling the panels. The ribbing 52 is shaped to present smoothly rounded corners at which the side and end walls merge, as well as to define entrance and exit openings or passages at 53 and 54 through which the tape passes. Such openings are presented between smoothly rounded inwardly extending pairs of protrusions 55 and 56 constituted by the ribbing forming the inner surfaces of the end walls, the walls of the openings being arranged as curvilinear extensions or continuations of the surfaces of the protrusions. A continuous channel 57 in the ribbing 52 extends about one side of the cartridge, joining the passages 53, 54 and receiving the bight of the endless tape 49 which extends between opposite ends of the bundle in the storage chamber 48.

By locating the entrance and exit openings 53, 54 for the tape 49 substantially at the centers of the opposite ends of the storage chamber 48, rather than at the corners of the storage chamber as in Fig. 1, substantially longer folds or pleats of tape can be accommodated. Accordingly, more tape, with longer recording time, can be stored in a cartridge of given length. It will be appreciated that the length of the folds that can be employed with an particular tape is governed by the length of such tape that can be pushed into the form of a fold without improper distortion of the tape in its unsupported length between the entrance opening and the location of the crease at the end of the last previously completed fold. With the center opening arrangement, the tape is pushed first to one side of the opening and then to the other so that the sum of these two lengths nearly doubles the available overall length for the folds. Moreover, such central location of the entrance and exit openings and the end walls inhibits any tendency of the tape to catch, as, for example, on the protrusions 35 in Fig. 1 to make a false fold. The center opening arrangement also has the advantage that at those instants when the tape is extending from the opening substantially directly to the face of the bundle a part of a fold has already been laid down, thereby insuring against any subsequent tendency of the tape to fold in a wrong direction.

Upon reference to the series of stop motion views in Figs. 11 to 16, the motion of the tape 49 utilized in automatically laying it down in successive folds will be apparent. Referring first to Fig. 11, it will be seen that the tape 49 is entering the chamber 48 from the channel 57 through the entrance 53 in the direction of the arrow A. A fold of the tape has, at this point, almost been completed. As further tape is pushed in it assumes the position shown in Fig. 12. The fold has now straightened up at its upper end and the tape extends almost directly from the entrance opening 53 to the face of the bundle, a lower fold having just barely started. The pressure of the completed upper fold insures that at this point the entering portion of tape will bulge downward as shown in Fig. 12, rather than having any tendency to bulge upward in a false half length fold. Moreover the curvature of the protrusion 55 over which the tape extended, when in the position of Fig. 11, bulged the tape in a direction proper for such action. As a further increment of tape is pushed into the chamber the descending loop of tape assumes the position shown in Fig. 13 and continues to move downward until the next crease in the tape comes along and at which time the tape bellies out into the position shown in Fig. 14. The entrance of a still further increment of tape pushes his creased end downward to the position of Fig. 15 and finally the lower fold is completed as in Fig. 16, the bulge of the tape for starting the next upper fold having already begun. The tape thus enters smoothly and easily, laying down automatically in proper folds, both because of its precreased condition and the shape of the coacting stationary guide surfaces or walls of the chamber.

The tape is already moving in proper direction for laying down the next fold before one fold is completed. And it is urged to move in such proper direction by the resilient pressure of the material constituting such preceding, partially completed fold.

At the same time that the tape is being entered into the storage chamber 48 of the cartridge it is also being progressively withdrawn in an equally smooth flow from the exit opening 54 at the opposite end (Figs. 17 to 22). Upon reference to Fig. 17 it will be seen that a lower fold of tape 49 is just about to be withdrawn through an exit opening 54. As the motion continues the creased lower end of the fold is pulled upward to the position of Fig. 18, the crease next rides over the bulge 56 into the position of Fig. 19. Then as the withdrawal of the tape continues the tape is drawn more or less taut to the crease at the upper end of a fold (Fig. 20) and that fold is gradually collapsed (Figs. 21 and 22).

The pressure of the partially entered and partially withdrawn or bulged folds at opposite ends of the accordion-like bundle of tape retain the bundle substantially in the shape shown in Figs. 2 and 4, much as if it were squeezed together at the center by the pressure of a person's fingers gripping it. It will be perceived that the shape of the inner surfaces of the peripheral walls of the storage chamber 48 have been calculated to conform in large measure with this bundle shape. Thus the curvature of the rounded corners of the chamber is such as to conform with the fan shaped corners of the bundle. Similarly, the projections 55 and 56 at opposite sides of the entrance and exit throats are contoured to conform generally with the shape of the loops bulged in the tape. Any tendency of the tape bundle to depart from that proper pattern is thus resisted by the surrounding walls.

As the tape is being continuously fed into and out of the storage chamber 48 the bundle is generally stationary, having a gradual and somewhat intermittent shift bodily away from the entrance opening resulting from the continual addition of folds to one end of the bundle and withdrawal of folds from the opposite end. At all times only a small fraction of the total length of the tape is moving endwise (as distinguished from the overall bodily shift of the bundle), the portion moving endwise being the bight extending through the channel 57.

The specific dimensions of the cartridge are governed in large measure by the particular tape employed and the length of recording time which it is desired to accommodate. Certain general considerations govern, however. Thus the depth or thickness of the chamber 48 between the opposed flat faces of the top and bottom walls 50, 51 is desirably only slightly in excess of the width of the tape. Similarly the distance D between the chamber side walls (Fig. 4) is substantially equal to the length between the creases in the tape for forming the folds. The length of the chamber between the entrance and exit openings 53, 54 is governed largely by the total length of tape which it is desired to accommodate. The permissible length of fold, and hence the dimension D, depends on the physical characteristics, and particularly the stiffness and resiliency, of the tape used. The cartridge illustrated was designed for coated paper tape such as is currently available on the market for use with reel type winders. That particular tape is a quarter inch wide and of the order of 0.002 inch in thickness. Such tape being made for use on reel type winders, its manufacturers have taken particular care to afford a sufficient tensile strength for the purpose, and which is in the order of magnitude of six pounds. Because the tensile load imposed on the tape is so slight in the apparatus herein disclosed, any such strength as that is not required for tape for the present purpose. By using a narrower and thinner tape, if and when it becomes available in suitable quantities on the market, a much larger length of tape can be stored in the same cubic capacity in the present cartridge.

Drive for the tape 49 in the cartridge 47 is accomplished by a friction roller 58 (Figs. 2 and 4). A rubber tire 58b on the periphery of the roller insures good frictional contact with the tape. This feed roller is engaged with the tape closely adjacent the tape's point of entry into the entrance passage 53 for the storage chamber, a window or slot 59 being formed in the outer walls of the channel 57 for that purpose (Figs. 4 and 5). This slot 59 is desirably of lesser width than the tape (Fig. 5) so that the remaining portions of the wall bordering the slot form retaining shoulders or ledges to keep the tape from spinning out when the roller is not in contact with it. The inner wall of the channel 57 opposite the slot 59 is concaved slightly to match the curvature of the wheel periphery and thus form a smooth complemental abutment surface against which the wheel may press the tape when driving it.

Any suitable motor drive may be provided for the friction roller 58. In this instance a shaded pole type synchronous motor 60 (Fig. 4) is utilized. The shaft 61 of this motor frictionally engages a rubber tire 62a on the periphery of a disk 62 interposed for speed reduction purposes. This latter disk 62 is fixed on the same shaft 63 which carries the feed or drive roller 58 (see also Fig. 5), such shaft being journalled in a suitable bearing (not shown) mounted on the frame of the motor.

Two heads 39 may be employed with the cartridge of Fig. 2, the one adjacent the feed roller 58 being utilized as a recorder-reproducer head and the other as an eraser head. Since the two may be identical in construction, a description of one will suffice for both. As a matter of fact, the head may take a variety of forms, it being desirable, however, that two general characteristics or features be embodied. One is that the pole pieces of the head should be arranged so as to extend inward toward each other with a very narrow gap between them and contoured for the tape to run over the surface of such opposed ends and across the edge of the gap. The second is that the gap should be disposed at an acute angle with respect to the path of travel of the tape, preferably of the order of 60° as shown.

The particular head structure illustrated is one well suited for quantity production. In it the pole pieces 42, 43 are fashioned as metal stampings of inverted L-shape and are jointed at their lower ends by a U-shaped metal stamping or core 64 (Figs. 3 and 7) which completes a magnetic circuit between them. The actuating windings 44 encircle respective ones of the pole pieces, aiding in clamping the legs of the U-shaped piece 64 to them. Both the pole pieces and U-shaped piece 64 are made of soft iron or other suitably magnetizable material. Straddling the assembly at right angles to the U-shaped core piece 64 is an inverted U-shaped bracket 65 made of brass or other non-magnetic material with a spacer 66, likewise made of non-magnetic material, interposed between it and the overlying ends of the pole pieces.

The gap G (Figs. 7, 8 and 9) between the opposed ends of the pole pieces 42, 43 is located so as to be on a bias or angle of approximately 60° with respect to the longitudinal axis or path of travel of the portion of tape 49 passing over it. By virtue of such arrangement any tendency for the creases in the tape to impair the fidelity of sound reproduction is overcome. One such crease is indicated at C in Fig. 9. It will be observed that as this crease passes over the gap between the pole pieces there is never at any instant more than a very minute length of the crease actually registering with the gap. As a consequence, successive creases passing over the head do not cause corresponding successive clicks in the sound reproduction, even though the tape has been used for a long time and the paramagnetic coating or impregnation is substantially impaired at the crease.

The width of the pole pieces 42, 43 is such that they may be entered in suitable windows or slots 67 (Figs. 4 and 6) fashioned in the corner portions of the cartridge and opening into the channel 57 as shown. The inner wall of the channel at such points is slightly concaved to conform with the convexity of the outer faces of the pole pieces.

Provision is also made in the apparatus of Fig. 2 for automatically stopping the feed motor 60 when the endless loop of tape 49 has passed once around over the recorder-reproducer head. For that purpose a pair of apertures 68 (Fig. 4) spaced longitudinally of the tape 49 are provided in it. These apertures coact with a switch mechanism designated generally as 69 (Figs. 4 and 10). Such switch mechanism includes an electrically conductive metal spring contact 70 inset into a recess 71 in the inner wall of the channel 57 and having inturned ends so arranged that the central body of the spring tends to resist inward pressure. The switch mechanism also includes a pair of contact prongs or feelers 72 mounted on an insulating head 73 and spaced to enter a pair of holes 74 in the outer wall of the channel 57 opposite the recess 71. A light compression spring 75 yieldably urges the contact prongs 72 inward so that their rounded noses bear on the under-riding tape 49. So long as the contact prongs 72 are actually in contact with the tape they are substantially insulated from each other, the electrical resistance of the tape being high. When the tape apertures 68 finally arrive at the switch mechanism 69, however, the prongs or feelers 72 drop into respective ones of the apertures and are thereupon bridged by the conductive strip 70 which they then contact. This completion of a circuit between them may be utilized to operate a relay or other suitable device (not shown) for rendering the drive motor 60 inoperative to advance the tape.

Two of the heads 39, such as described above, have been shown at the respective lower corners of the cartridge 47 in Fig. 2 and likewise a second feed roller 58a has been indicated in broken lines at the side of the cartridge opposite the feed roller 58. Such duplication of heads and of rollers is not in all cases requisite. The second feed roller 58a may be used or not depending upon whether it is desired to make provision for reversing movement of the tape. It will be appreciated, of course, that such reverse movement is not required for many purposes since the tape is endless and, hence, driving it in but one direction will serve to pass it time after time past a head. Moreover, one of the two heads 39 can be omitted if provision is made for erasing as well as recording or reproducing, or both, all with one head. It is contemplated that the second or left head will, in the present instance, serve as a separate eraser head and would in such case be connected to a source of direct current or to a high frequency source (not shown). The right hand head 39 serves as a recorder-reproducer head.

Desirably the head or heads 39 which are used and the roller or rollers 58, 58a which are used, as well as switch mechanism 69 are disposed as shown in Fig. 2 for reception of the cartridge 47. The feed rollers 58, 58a, as well as the associated electric motors on which they are mounted, are movably supported by some suitable means (not shown) so that they will be yieldably spring urged inward toward the cartridge. Thus when the removable cartridge is pushed downward it seats against the heads 39 and switch mechanism 69, the rollers 58, 58a snapping into place in the notches 59 provided for them. An upward pull on the cartridge serves to withdraw it in order that it may be replaced by another.

To afford a continuous visual indication of the unused amount of tape available, a fold 76 of red cellophane (Fig. 4) or like material of color contrasting with that of the rest of the tape, which is usually black, is inserted in the endless loop of tape 49 adjacent the holes 68. For coaction with this fold a scale 77 may be inscribed on the cover 50 adjacent one side edge. The point of the brightly colored fold 76 moves along this scale 77 acting as a pointer. Such arrangement is particularly useful in the event that the cartridge is used in a dictating machine since a card may be laid alongside the scale and marked at appropriate points by the dictator to apprise the secretary of the location of corrections, insertions, and the like.

Operation of the cartridge type installation shown in Fig. 2 will, in general, be clear from the foregoing. By way of brief recapitulation it may be noted that the cartridge 47 is inserted into the position shown. To record on the tape 49 the motor 60 is started, a suitable energizing circuit being connected to the windings of the right hand head 39. The tape 49 flows smoothly out of the chamber 48, past the left hand or eraser head 39, over the right hand or recorder head and back into the storage chamber. When the entire tape has been recorded, the switch mechanism 69 automatically stops the feed. To play back the record recorded the eraser circuit is disabled, a reproducer circuit connected to one of the heads 39, and tape feed effected just as before. Continuous indication of the progress of the record is afforded at all times by movement of the pointer fold 76 along the scale 77. To effect instantaneous stoppage of the tape during either recording or reproducing the roller 58 is pulled bodily outward out of contact with the tape. Whenever desired another and identical cartridge may be used to replace the one shown.

In Fig. 23 is illustrated, more or less in diagrammatic style, another embodiment of the present invention. The apparatus there shown follows the general style of those previously described with the general exception that it is arranged to accommodate a double ended length of tape 78 rather than an endless loop such as is employed in the apparatus of Figs. 1 and 2.

The tape 78 is, like the tapes 30 and 49 previously identified, creased transversely at uniformly spaced points for accordion pleating of the same throughout its length. Like the previously mentioned tapes, it may be made of paper, coated or impregnated with paramagnetic material. The tape 78 is received in this instance in a cartridge type housing 79 indicated in broken lines and providing two storage chambers 80 and 81 rather than a single storage chamber. The upper end walls of these chambers 80, 81 have openings 82, 83 therein and such upper walls are shaped in precisely the same manner as the end walls of the cartridge 47 in Fig. 2. To put it another way, the structure is substantially the same as if the housing or casing structure of the cartridge 47 was cut in half, transversely, and the two halves secured together side-by-side.

The end portions of the tape 78 are anchored in the bottoms of respective ones of the chambers 80, 81, the tape being bundled accordion fashion in these two chambers with a length or bight of the tape extending exteriorly of the chambers between the openings 82, 83. A recorder-reproducer head 39, identical in construction with the heads 39 previously described, is disposed for coaction with this portion of tape leading between the openings 82, 83.

A friction type feed roller 84 serves to feed the tape from the chamber 81 into the chamber 80; and there is likewise a friction feed roller 85 which serves to feed the tape in the opposite direction from the chamber 80 into the chamber 81. Alternative drive of the feed rollers 84, 85 in their appropriate directions is accomplished by a single reversible drive motor 86. This drive motor is a small synchronous electric motor pivotally supported at 87 to shift between two alternative positions in which its shaft 88 contacts the periphery of alternatively available disks 89 and 90. Such disks are interposed for speed reduction purposes and are rigid with respective feed rollers 84, 85 for rotation therewith. When the motor is swung to the position shown in Fig. 23 its shaft contacts and revolves the disk 89, thereby rotating the roller 84 to feed the tape past the head 39 and into the chamber 80. Similarly, when the motor 86 is swung over to the left, from the position shown in Fig. 23, its shaft is disengaged from the disk 89 and engaged with the disk 90 to rotate the corresponding feed roller 85, the motor being reversed.

Suitable provision is made for erasing, such for example as a permanent magnet eraser 91 carried by an arm 92 pivoted at 93 to swing into and out of operative relation with the tape.

In the operation of the apparatus shown in Fig. 23 suitable circuits (not shown) are of course connected to the recorder-reproducer head 39 for either impressing a magnetic pattern on the tape 78 or for operating an amplifier in accordance with a magnetic pattern on the tape. In a normal cycle of operation the motor 86 is swung over from the position shown in Fig. 23 to bring its shaft 88 into contact with the disk 90 and the circuits connected to the head 39 are conditioned for recording. The tape is thereupon fed continuously from the chamber 80 into the chamber 81. As the tape passes under the eraser head 91 it is cleared of any previous magnetic impression preparatory to passing under the head 39. A magnetic pattern or record is thus impressed on the tape 78 and the same is stored in the chamber 81. The recording can be interrupted at any time simply by swinging the motor 86 to an intermediate position in which its shaft 88 is out of contact with both of the disks 89, 90. Then preparatory for playback of the recording the motor 86 is swung into the position shown in Fig. 23 whereupon the tape 78 is fed continuously by the roller 84 from the chamber 81 back into the chamber 80. The eraser head 91 is, of course, swung upward into an inoperative position. Then, as in recording, the motor is shifted to feed the tape from chamber 80 to 81 past the head 39 but this time with a suitable reproducer circuit (not shown) connected to the head.

I claim as my invention:

1. In an apparatus of the type set forth, the combination of an endless loop of paramagnetic record tape creased transversely at uniformly spaced intervals throughout its length for accordion-pleating, a holder mechanism defining an interior chamber bounded by opposed parallel side and end walls for retaining a major portion of said tape in an accordion-like bundle, means defining slits for guiding the tape into and out of said chamber adjacent the ends of said bundle, and a feeding mechanism operative to produce endwise movement of the portion of said tape joining the ends of said bundle by progressively withdrawing said tape fold-by-fold from one end of such bundle and simultaneously restoring folds of tape to the opposite end of the bundle, the creases in said tape being spaced from each other such that the length of tape between adjacent creases tends to form a substantial single curved bow upon endwise feeding and withdrawing of said tape, and said slit-defining means being positioned relative to said end walls to produce coaction between said tape and said end walls so that the folds of tape being withdrawn and restored to said bundle bow inwardly toward said bundle.

2. The combination with a casing defining a chamber having spaced entrance and exit openings, of an endless loop of paramagnetic record tape creased transversely at uniformly spaced intervals throughout its length for accordion-pleating and disposed with a major portion thereof in an accordion-like bundle in said chamber, the portion of said tape joining the ends of such bundle being led out of one of said openings and back into the other.

3. As an article of manufacture, a replaceable record cartridge comprising a thin flat casing including opposed top and bottom walls between which a shallow chamber is defined and which is bordered peripherally by opposed pairs of end and side walls, said side walls being substantially parallel, said casing having entrance and exit openings therein adjacent the opposed ends of said chamber, an endless loop of paramagnetic record tape creased transversely at uniformly spaced intervals throughout its length for accordion pleating of the same, a major portion of said tape being bundled in accordion-like folds in said chamber and disposed with the portion of tape joining the ends of such bundle led through said openings, the width of said tape being substantially equal to the spacing between said top and bottom walls, and the distance between successive creases in said tape being substantially equal to the spacing between said opposed side walls, said entrance and exit openings being positioned relative to the walls of said casing and the bundle of tape to cause the accordion-like folds at the respective ends of said bundle of tape to assume an inwardly bowed shape upon feeding said tape endwise into and out of said openings.

4. As an article of manufacture, a replaceable record cartridge comprising a thin flat casing including opposed top and bottom walls between which a shallow chamber is defined by peripheral border walls including a pair of substantially parallel opposed side walls, said chamber having an opening in at least one end thereof, a portion of paramagnetic record tape disposed within said chamber and led out through said opening, said tape being creased transversely at uniformly spaced intervals throughout its length for accordion pleating with the distance between successive creases substantially equal to the spacing between said side walls, the portion of said tape within said chamber being bundled in accordion-fashion and the width of said tape being substantially equal to the space between said top and bottom walls.

5. As an article of manufacture, a replaceable record cartridge comprising a thin flat casing including opposed top and bottom walls between which a shallow chamber is defined and bordered peripherally by opposed pairs of end and side walls, said side walls being substantially parallel, said casing having an opening in the central portion of at least one end wall thereof, the inner surface of such end wall being bulged first inwardly and then outwardly in smoothly flowing curves at each side of said opening, a portion of paramagnetic record tape disposed within said chamber and led out through said opening, said tape being creased transversely in accordion pleats at uniformly spaced intervals, the spacing between creases being substantially equal to the spacing between said opposed side walls, and the width of said tape being substantially equal to the spacing between said top and bottom walls.

6. In an apparatus of the type set forth, the combination of a portion of paramagnetic record tape creased transversely at uniformly spaced points throughout its length in accordion pleats, a housing defining an interiorly located chamber in which a part of said tape is bundled accordion-fashion, said housing presenting opposed flat walls to the side edges of the tape in such bundle and between which the folds of the bundle slide freely in compression or expansion of such bundle, said housing having an opening therein presented substantially at the center of an end of said bundle and through which the tape extends, means including a friction feed roller engageable with the tape adjacent said opening for pushing the tape endwise through said opening into said chamber, and the inner surface of the end wall of said chamber at each side of said opening being bowed inward for a substantial portion of the length of the end wall and then outward in substantial conformity with the fan shape impressed on the end of the bundle by entering folds of tape.

7. As an article of manufacture, a replaceable record cartridge comprising a thin, flat casing including opposed top and bottom walls between which a shallow chamber is defined and bordered peripherally by opposed pairs of end and side walls, said side walls being substantially parallel, said casing having entrance and exit openings in the central portions of respective ones of said end walls, the inner surface of such end walls being extended first inward and then outward in smoothly flowing and merging curves at each side of the central openings therein, an endless loop of paramagnetic record tape extending through one of said openings into said chamber and thence out of the chamber through the other opening, said tape being creased transversely at uniformly spaced intervals throughout its length in accordion pleats and disposed with a major portion of the tape bundled accordion-fashion in said chamber, and the spacing between successive creases in said tape being substantially equal to the spacing between said side walls.

8. As an article of manufacture, a replaceable record cartridge comprising a thin, flat, molded plastic casing including opposed top and bottom walls between which a shallow chamber is defined and bordered peripherally by opposed pairs of end and side walls, said side walls being substantially parallel, said casing having entrance and exit openings in the central portions of respective ones of said end walls, the inner surfaces of such end walls being bulged first inwardly and then outwardly in smoothly flowing and merging curves at each side of the respective openings therein and said end walls merging in smoothly rounded corners into the adjacent side walls, an endless loop of paramagnetic record tape extending through one of said openings into said chamber and thence out of the chamber through the other opening, said tape being creased transversely at uniformly spaced intervals throughout its length in accordion pleats and disposed with a major portion of the tape bundled accordion-fashion in said chamber, the spacing between successive creases in said tape being substantially equal to the spacing between said side walls, and the width of said tape being substantially equal the spacing between said top and bottom walls.

9. As an article of manufacture, a replaceable record cartridge comprising a generally rectangular casing of thin flat form, said casing including a pair of opposed flat top and bottom panels, ribbing separating the two panels and rigid with at least one of the same, said ribbing constituting opposed pairs of end and side walls merging to form a peripheral border about a shallow interior chamber, the inner surfaces of said end walls each having a generally central opening therein and being extended inwardly in smoothly turned portions on each side of their respective openings, said side walls being generally parallel and merging in smoothly rounded contours with the adjacent ends of said end walls, said ribbing also defining a channel extending exteriorly of said chamber between said openings and contoured to form a smoothly flowing continuation of the curves of said bulges at its juncture with the same, an endless loop of paramagnetic record tape transversely creased throughout its length in accordion pleats, said tape being disposed in said channel and extending therefrom into said chamber with a major portion of the tape bundled accordion-fashion in said chamber, the spacing between successive creases in said tape being substantially equal to the spacing between said opposed side walls, and the width of said tape being substantially equal to the height of said ribbing, the inwardly extended portions of said end walls being shaped to conform generally to the loop configuration of said tape adjacent said openings as the top is moved endwise into and out of the openings.

10. As an article of manufacture, a replaceable record cartridge comprising a thin flat casing including opposed top and bottom walls between which a storage shallow chamber is defined which is bordered peripherally by opposed pairs of end and side walls, said side walls being substantially parallel, said casing having entrance and exit openings in the central portions of respective ones of said end walls, the inner surfaces of such end walls being extended inwardly in smoothly flowing curves at each side of the respective openings therein, an endless loop of paramagnetic record tape creased transversely at uniformly spaced intervals throughout its length in accordion pleats and disposed with a major portion of the tape bundled accordion-fashion in said chamber, the spacing between successive creases in said tape being substantially equal to the spacing between said side walls and the width of said tape being substantially equal to the spacing between said top and bottom walls, said tape being led from one end of said bundle out of one of said openings and thence about the exterior of the intervening portion of said border walls and back through the other opening to the other end of said bundle, and said casing including a portion guidingly retaining said tape flat against the portions of said border walls about the exterior of which it extends, the inwardly extended portions of said end walls conforming substantially to the configuration of said tape bundle within said chamber and adjacent said openings as the tape is moved endwise into and out of said openings.

11. As an article of manufacture, a replaceable record cartridge of thin, flat package form comprising a casing constituted by closely spaced top and bottom panels separated by ribbing integral with at least one of said panels, such ribbing being arranged to border peripherally a shallow storage chamber defined by such ribbing between said panels, said ribbing having a narrow channel in a portion thereof extending at least part way about the periphery of said chamber and communicating at its opposite ends with the interior of said chamber, and an endless loop of paramagnetic record tape transversely creased at uniformly spaced points throughout its length for accordion pleating arranged with a major portion of such tape bundled accordion-fashion in said chamber and the remainder extending through said channel, said ribbing having an exterior aperture therein opening into said channel for exposure of the portion of tape in such channel.

12. In an apparatus of the type set forth, the combination of an endless loop of paramagnetic record tape creased transversely at uniformly spaced points for accordion pleating of the same, a housing confining a major portion of said tape bundled accordion-fashion, a fold of material contrasting in color with the remainder of the loop of tape interposed in said loop, said housing having a transparent portion overlying the path of travel of said fold within said housing, and indicia associated with said transparent portion and located for coaction with said fold to afford a visual indication of its location in said bundle.

13. In an apparatus of the type set forth, the combination of an endless loop of paramagnetic record tape creased transversely at uniformly spaced intervals throughout its length for accordion pleating of the same, a housing defining a chamber confining a major portion of such tape bundled accordion-fashion, a mechanism including a friction feed roller engageable with said tape for moving endwise the portion of the same joining the ends of the bundle to withdraw the tape fold-by-fold from said bundle and restore it in like manner to the opposite end of said bundle with said joining portions being fed exteriorly about said chamber, said tape having an aperture therein, a feeler arranged exteriorly of said chamber and positioned to override said joining tape portion, and means responsive to dropping of said feeler into said aperture, for stopping the tape moving mechanism.

EDWARD L. BARRETT.

REFERENCES CITED

The following references are of record in the file of this patent:

UNITED STATES PATENTS

| Number | Name | Date |
|---|---|---|
| 1,271,247 | Wade | July 2, 1918 |
| 1,341,108 | Burnett | May 25, 1920 |
| 1,365,237 | De Forest | Jan. 11, 1921 |
| 1,523,173 | Clark | Jan. 13, 1925 |
| 2,288,983 | Weiss | July 7, 1942 |
| 2,401,632 | Greenleaf | June 4, 1946 |

FOREIGN PATENTS

| Number | Country | Date |
|---|---|---|
| 9,916 | Great Britain | Nov. 20, 1913 |
| 282,300 | Great Britain | Dec. 22, 1927 |
| 441,479 | Great Britain | Jan. 13, 1936 |
| 678,099 | France | Dec. 23, 1929 |